No. 782,001.

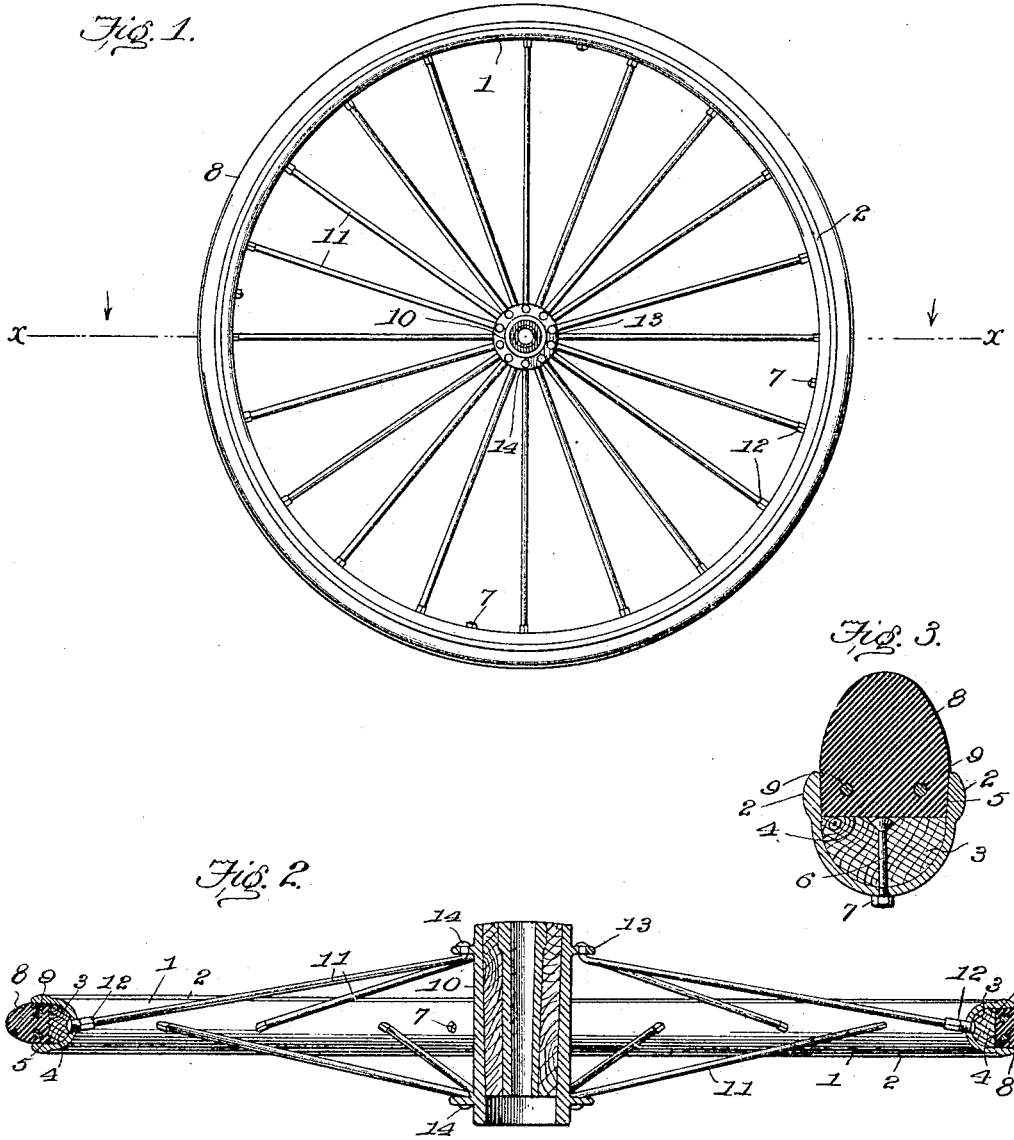

Patented February 7, 1905.

UNITED STATES PATENT OFFICE.

JOSEPH N. BYERS, OF URBANA, OHIO, ASSIGNOR OF ONE-HALF TO WILLIAM R. RAMSEY, OF URBANA, OHIO.

VEHICLE-WHEEL.

SPECIFICATION forming part of Letters Patent No. 782,001, dated February 7, 1905.

Application filed March 12, 1903. Serial No. 147,458.

*To all whom it may concern:*

Be it known that I, JOSEPH N. BYERS, a citizen of the United States, residing at Urbana, in the county of Champaign and State of Ohio, have invented certain new and useful Improvements in Vehicle-Wheels, of which the following is a specification, reference being had therein to the accompanying drawings.

This invention relates to vehicle-wheels, and has for its object to provide a composite wheel of wood and metal combining the lightness and strength of the two materials and producing a strong and durable wheel.

More specifically, my invention relates to the construction of a wheel of the suspension type having a rim constructed of wrought metal, preferably sheet-steel, having a trough-like form and containing a combined stiffener and filler of wood of less height than the depth of the trough, thus forming a seat to receive a rubber tire, the structure having certain features of advantage which will be hereinafter pointed out.

To these ends my invention consists in certain novel features, which I will now proceed to describe and will then particularly point out in the claims.

In the accompanying drawings, Figure 1 is an elevation of a wheel embodying my invention. Fig. 2 is a sectional view of the same, taken on the line $x$ $x$ of Fig. 1 and looking in the direction of the arrows; and Fig. 3 is an enlarged detail sectional view through the rim and tire, taken radial to the wheel at one of the bolts connecting the wooden and metallic portions of the rim.

In the said drawings, 1 indicates the metallic portion of the rim, which is in the form of a trough or channel U-shaped in cross-section and of comparatively great depth. This metallic portion of the rim is preferably made from sheet-steel by the usual rolling process and is comparatively thin and light, although its cross-section is such as to give it considerable strength. I prefer to form upon the outer sides of the parallel arms or flanges of the metallic rim strengthening ribs or enlargement 2, which give the same increased strength at these points and protect them from injury by contact with stones or other obstacles when in use. Fitting within the inner portion of the channel or hollow of the metallic rim 1 is a combined strengthening and filling device 3, consisting of an annular strip of wood having its inner side rounded to fit the trough or channel of the metallic part of the rim, while its outer face is flat or plane in cross-section, as indicated at 4. This wooden portion of the rim is of less thickness than the depth of the metallic channel, thus leaving a seating-space 5, having a transversely flat bottom formed by the outer face of the wooden rim and lateral defining-walls at substantially right angles to said bottom or in parallel radial planes formed by the outer portions or flanges of the metal portion of the rim. The wooden and metallic portions may be united in any suitable manner; but I prefer for this purpose bolts 6, having their heads countersunk in the outer face of the wooden member, through which and through the metal member they pass radially inward, their projecting inner ends receiving clamping-nuts 7. The composite rim thus constructed combines lightness and strength, and while the metal channel has great depth and corresponding rigidity the seating-channel 5 for the rubber tire is comparatively shallow, so that a relatively small quantity of rubber is required, and the greater portion of the rubber lies outside of the channel, where its resilience may be utilized.

In the drawings, 8 indicates a rubber tire which may be of any suitable conformation, providing its base or inner portion fits the seating-channel 5, and which may be held in place in any approved manner—as, for instance, by retaining-wires 9.

The wheel is completed by means of a hub 10 and spokes 11, connected to the hub and rim in any suitable manner. I have shown the spokes as connected to the metal portion of the rim by means of the usual screw-threaded tensioning-nipples 12, while the inner ends of the spokes are secured to radial annular flanges 13 on the hub by passing said inner ends through apertures in said flanges, the spoke ends being provided with retaining-heads 14.

I am aware that it has been proposed to construct a vehicle-wheel rim or felly having a wooden body and a protective sheathing of metal in the form of a thin ribbon of steel or the like, said sheathing being shaped to form a securing-channel for the tire, such a construction being set forth in United States Letters Patent No. 509,261, granted November 21, 1893, to William W. Stall, and I make no claim to such a construction. In the construction which I have devised the metal portion of the rim is what gives its strength and rigidity, and this is obtained by reason of the fact that the rim is of comparatively great depth and presents two parallel flat portions connected by an arched portion, said flat portions being of considerable width or depth measured radially of the wheel and lying in the plane of the thrust which the wheel receives. This deep trough-shaped metal felly has great rigidity and strength, while lightness is assured by filling in the space between the bottom of the arch and the bottom of the tire with a filling of wood or other light material. If the metal rim were made shallow or shouldered to form a tire-seat near its outer portion, it would lack strength, while if the portion occupied by the filling-strips were of metal the rim would be unduly heavy.

I do not wish to be understood as limiting myself strictly to the precise details of construction hereinbefore described, and shown in the accompanying drawings, as these details may obviously be modified without departing from the principle of my invention.

Having fully described my invention, what I claim as new, and desire to secure by Letters Patent, is—

1. In a vehicle-wheel, a rim, the body whereof is composed of a deep trough-like annulus of sheet metal, U-shaped in cross-section and comprising two parallel portions of considerable depth lying in the plane of thrust, and a connecting arched portion, said metal body being of dimensions such as to form the load-sustaining portion of the rim, and a filling member of light material fitting the inner part of the metallic channel and of less height than the depth of said channel, whereby the space between the outer face of the filling member and the projecting flanges of the metallic member forms a seating-space of less depth than the channel of the metallic member to receive an elastic tire, substantially as described.

2. In a vehicle-wheel, a rim, the body whereof is composed of a deep trough-like annulus of sheet metal, U-shaped in cross-section and comprising two parallel portions of considerable depth lying in the plane of thrust, and a connecting arched portion, said metal body being of dimensions such as to form the load-sustaining portion of the rim, and a filling member of light material fitting the inner part of the metallic channel and of less height than the depth of said channel, whereby the space between the outer face of the filling member and the projecting flanges of the metallic member forms a seating-space of less depth than the channel of the metallic member to receive an elastic tire, said filling member having a transversely-flat outer face, substantially as described.

In testimony whereof I affix my signature in presence of two witnesses.

JOSEPH N. BYERS.

Witnesses:
  AL. H. KUNKLE,
  IRVINE MILLER.